United States Patent [19]

Lutz et al.

[11] Patent Number: 4,460,064

[45] Date of Patent: Jul. 17, 1984

[54] FORKLIFT TRUCK CAPABLE OF RAISING AND LOWERING ITSELF AND A LOAD BACK AND FORTH BETWEEN TWO SURFACES AT DIFFERENT LEVELS

[76] Inventors: David W. Lutz; David E. Lutz, both of P.O. Box 810, Carlisle, Pa. 17013

[21] Appl. No.: 384,549

[22] Filed: Jun. 3, 1982

[51] Int. Cl.³ .................. B60P 1/64; B66F 9/075; B62D 21/14

[52] U.S. Cl. .................. 187/9 R; 180/209; 180/326; 280/43.23; 280/638; 414/467

[58] Field of Search .......... 414/467, 498; 187/9 R; 280/43.23, 638; 180/24.02, 209, 326

[56] References Cited

U.S. PATENT DOCUMENTS 2,827,190  3/1958  Spitzmesser .
3,799,379  3/1974  Grether et al. .
3,865,262  2/1975  Smith .
3,972,427  8/1976  Stanley et al. .................. 414/467
4,061,237  12/1977  Austin et al. .
4,103,795  8/1978  Miller .
4,180,363  12/1979  Steiger et al. .
4,252,495  2/1981  Cook .
4,288,195  9/1981  Brewer .

Primary Examiner—Robert G. Sheridan
Attorney, Agent, or Firm—Oblon, Fisher, Spivak, McClelland & Maier

[57] ABSTRACT

A forklift truck is provided which is capable of raising and lowering itself and a load back and forth between two surfaces at different levels. The forklift truck comprises a body; telescoping rear legs which carry powered, ground-engaging wheels; one or more powered, steerable, ground-engaging wheels on the body; a vertically movable lift mast; and a pair of front legs which can be moved back and forth between a work position in which they support the load and a carry position.

12 Claims, 17 Drawing Figures

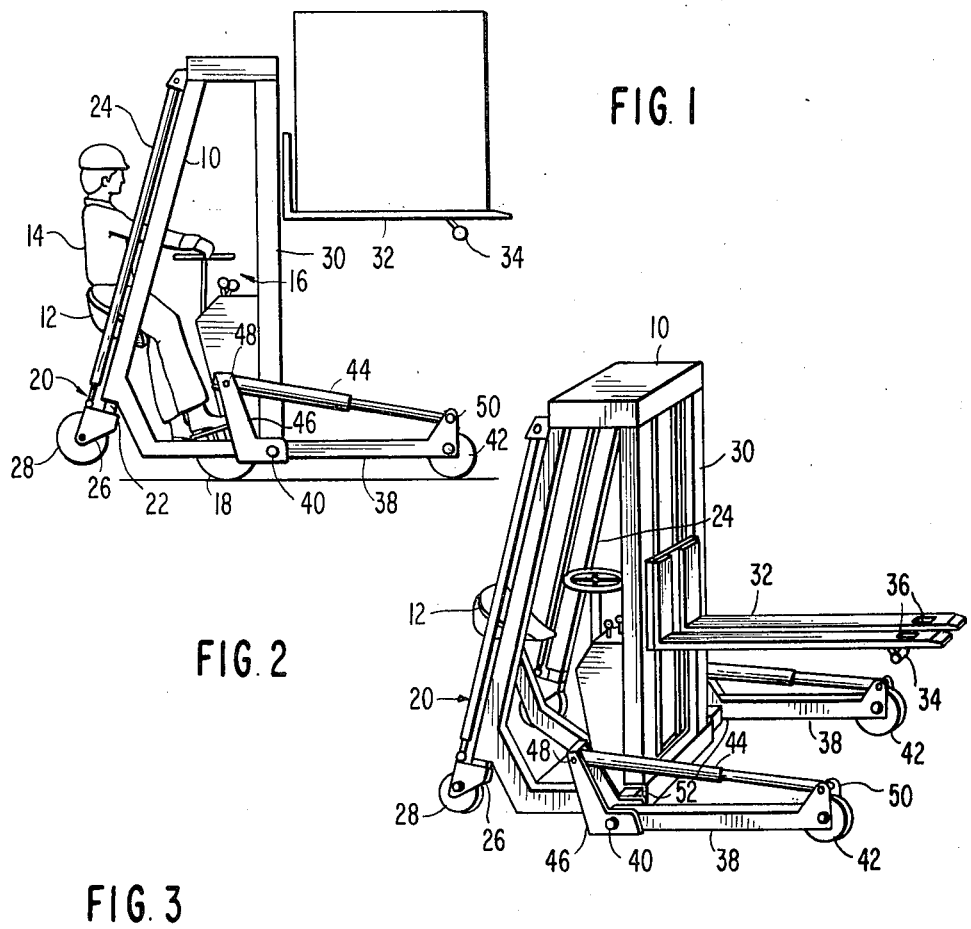
FIG. 1
FIG. 2
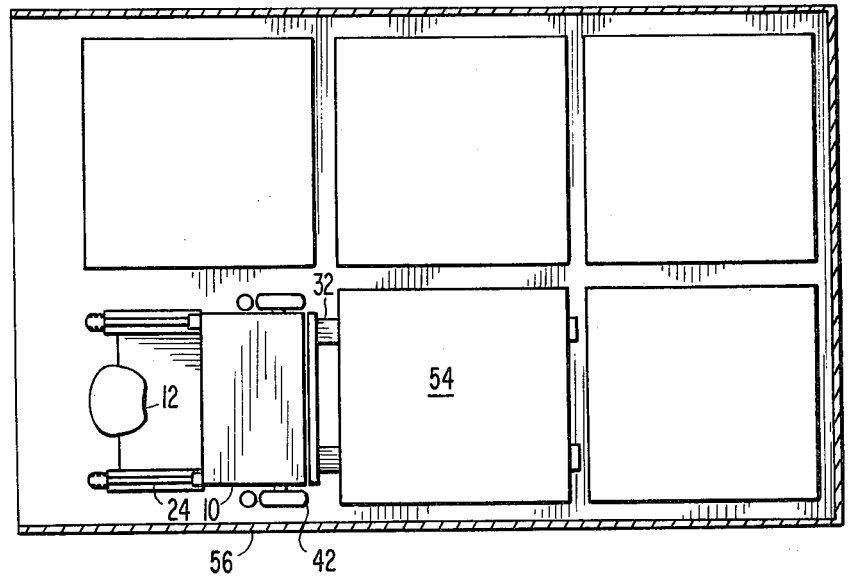
FIG. 3

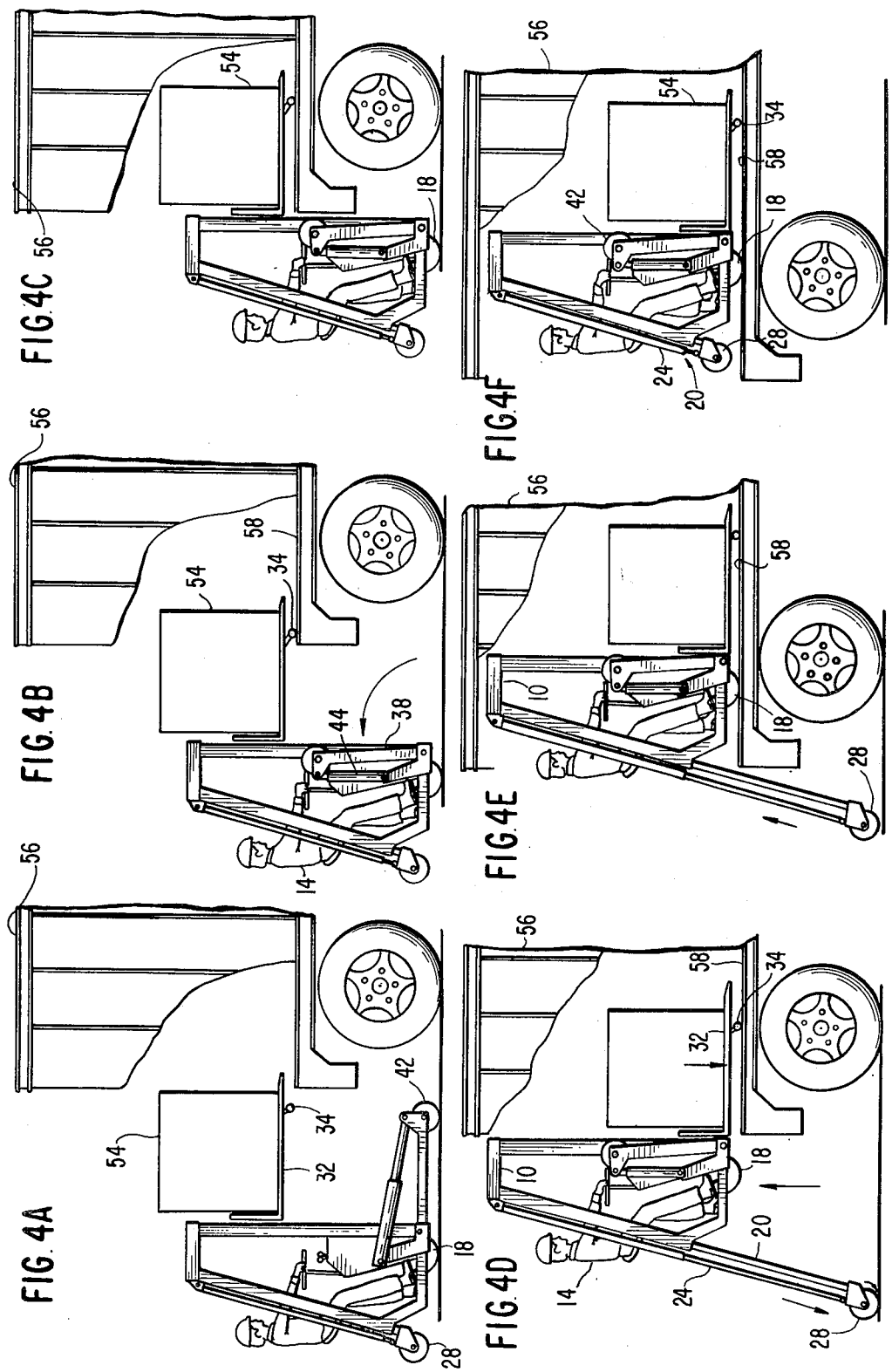

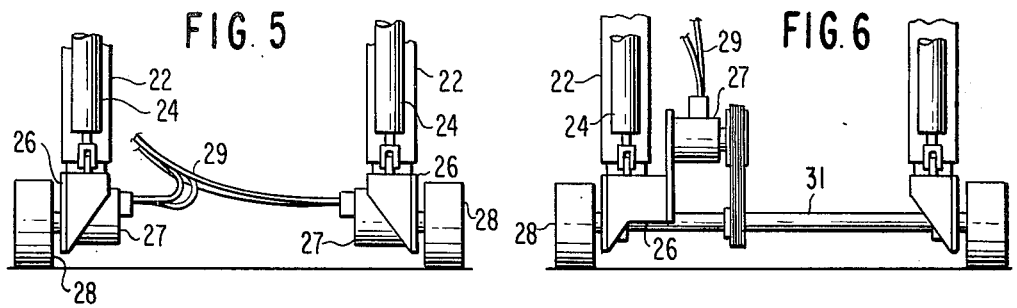
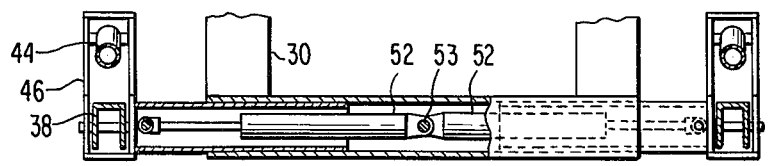
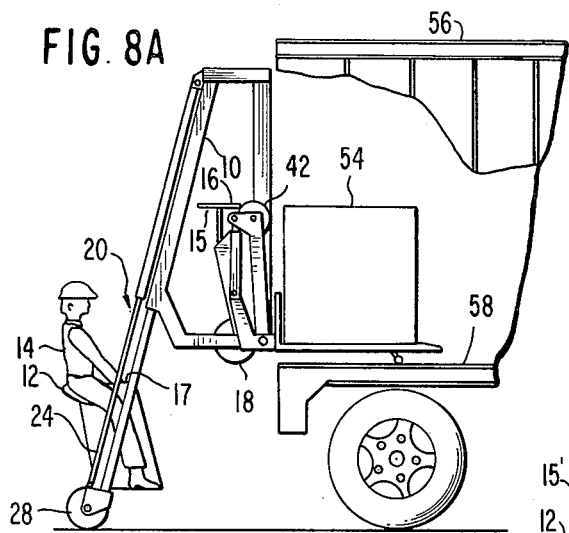
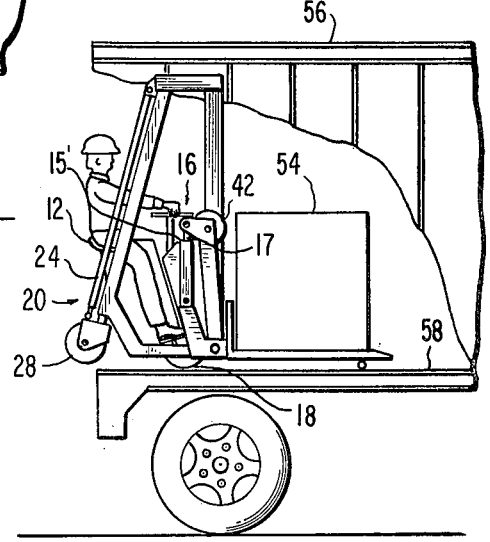

FORKLIFT TRUCK CAPABLE OF RAISING AND LOWERING ITSELF AND A LOAD BACK AND FORTH BETWEEN TWO SURFACES AT DIFFERENT LEVELS

FIELD OF THE INVENTION

This invention relates to forklift trucks. In particular, it relates to a forklift truck which is capable of raising and lowering itself and a load back and forth between a first surface level, such as the floor of a factory or loading dock, and a second, higher surface level, such as the interior of a truck.

BACKGROUND OF THE PRIOR ART

Forklift trucks are designed to lift loads of various sorts back and forth between two surface levels. For instance, one common use for forklift trucks is to load objects supported on pallets from a factory floor into the back of a truck, and another common use is to unload such objects from the back of a truck onto a delivery area of some kind. On occasion, a forklift truck will be unavailable when it is desired to load or unload the truck. On such occasions, it is often desirable to carry a forklift truck in the back of the larger truck. The forklift truck is then unloaded from the back of the larger truck, used to load and/or unload the larger truck, and then loaded back into the larger truck and driven away with the larger truck.

In order to get the forklift truck into and out of the back of the larger truck in such situations, various expedients are resorted to, the most common of which is probably the assembly and/or positioning of a loading ramp. In some such situations, the loading ramp must be carried on the larger truck, thereby reducing its payload, and in most such situations the assembly and/or positioning of the loading ramp takes time and is an aggravation. Accordingly, it would be very desirable to have a forklift truck which is capable of raising and lowering itself back and forth between two surfaces at different levels.

OBJECT OF THE INVENTION

It is, therefore, a principal object of this invention to provide a forklift truck which is capable of raising and lowering itself back and forth between two surfaces at different levels.

It is another major object of this invention to provide such a forklift truck in which the raising and lowering is entirely under the control of the operator of the forklift truck, who remains in the forklift truck as it is raised and lowered.

It is another major object of this invention to provide such a forklift truck which requires no special apparatus external to the forklift truck, so that it can be used, for instance, with any standard, unaltered van trailer.

It is a further object of this invention to provide such a forklift truck which is sturdy in use, not given to mechanical malfunctions, and not substantially more expensive to manufacture than standard forklift trucks which do not have this capability.

Other objectives and advantages of this invention will become apparent from the description of the presently preferred embodiments thereof given hereinafter.

SUMMARY OF THE INVENTION

A forklift truck according to this invention comprises a body; telescoping rear legs which carry powered, ground-engaging wheels; one or more powered, steerable, ground-engaging wheels on the body; a vertically movable lift mast; and a pair of pivotable legs which can be moved back and forth between a work position in which they support the load and a carry position.

BRIEF DESCRIPTION OF THE DRAWINGS

FIG. 1 is a side view of a first embodiment of a forklift truck according to this invention.

FIG. 2 is a perspective view of the forklift truck shown in FIG. 1.

FIG. 3 is a sectional plan view of a trailer van with the forklift truck shown in FIG. 1 in it.

FIGS. 4A-4F are side views showing the sequence of loading a container into the back of a trailer van, then loading the forklift truck into the back of the van, using the first embodiment.

FIG. 5 is a front view of a first embodiment of drive means for the powered, ground-engaging wheels on the telescoping rear legs.

FIG. 6 is a front view of a second embodiment of drive means for the powered, ground-engaging wheels on the telescoping rear legs.

FIG. 7 is a fragmentary, partially sectional view of the means for moving the front legs transversely relative to the body.

FIGS. 8A and 8B are side views showing the sequences of loading a container into the back of a trailer van, then loading of the forklift truck into the back of the van, using the second embodiment.

DETAILED DESCRIPTION OF THE PRESENTLY PREFERRED EMBODIMENTS

STRUCTURE OF THE FIRST EMBODIMENT

Figure 9:
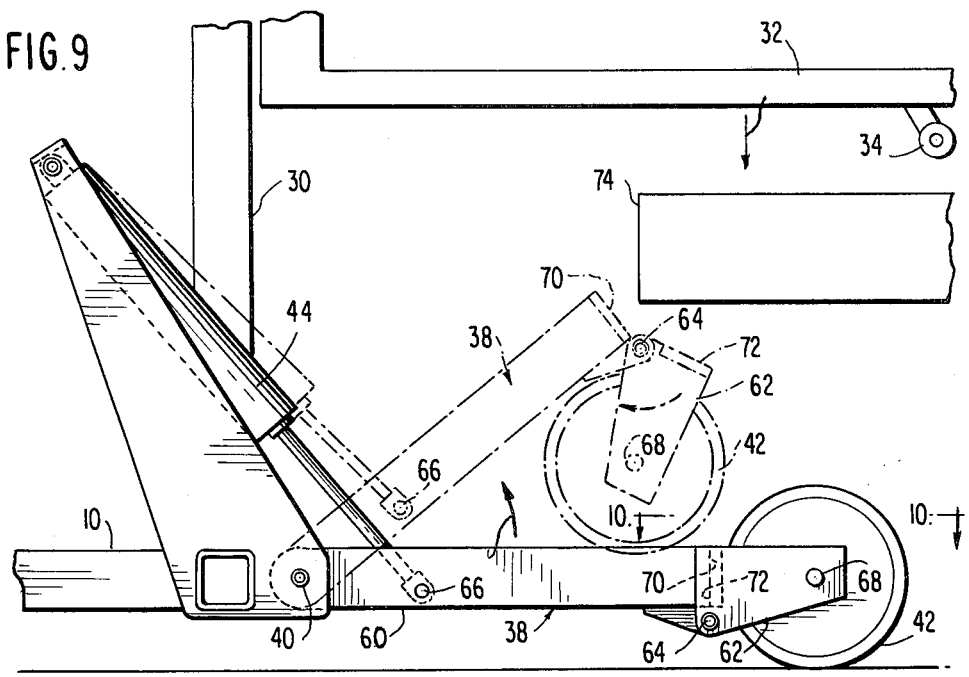
FIG. 9 is a fragmentary view of a third embodiment.
Figure 10:
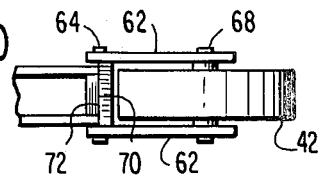
FIG. 10 is a sectional view taken on the line 10—10 of FIG. 9.

The forklift truck shown in FIGS. 1-4 comprise a body 10 and various components mounted on the body. The body 10 includes a seat 12 for an operator 14, controls 16, and a source of power (not shown). As is well known in the art, the source of power can be batteries or a small motor, such as a diesel engine. In any event, the power is used both to drive ground-engaging wheels (described hereinafter) and to drive a pump which provides hydraulic fluid under pressure to power a number of hydraulic cylinders, which are also described hereinafter.

One or more ground-engaging main drive wheels 18 are mounted on the body 10. The main drive wheels 18 are steerable via the controls 16 and are drivable in either the forward or reverse direction, also via the controls 16. Two telescopable rear legs 20 are mounted on the body 10. Each rear leg 20 comprises a strut 22 telescopably received in a bore (not shown) in the body 10, a hydraulic cylinder 24, and a wheel housing 26. The strut 22 and the hydraulic cylinder 24 are both connected at one end to the wheel housing 26, and the hydraulic cylinder 24 is connected at the other end to the body 10. A ground-engaging wheel 28 is mounted in each of the wheel housings 26. The ground-engaging wheels 28 may or may not be steerable, but in any event they are drivable in either the forward or reverse direction, also via the controls 16. The hydraulic cylinders 24 are individually controllable, to enable the operator 14 to compensate for unevenness of supporting surfaces.

FIGS. 5 and 6 show two alternative ways of powering the ground-engaging wheels 28. In FIG. 5, an individual hydraulic motor 27 powered by hydraulic lines 29 is used to power each wheel 28. In FIG. 6, a single hydraulic motor 27 powered by hydraulic lines 29 is used to power an axle 31 on which the two wheels 28 are mounted. In either case, the hydraulic lines 29 are mounted on a suitable take-up device, many kinds of which are available, to compensate for the telescoping of the rear legs 20.

A lift mast 30 is mounted on the body 10, and a pair of forks 32 are mounted on the lift mast 30. The forks 32 can be moved up or down on the lift mast 30 via the controls 16. Small (e.g., 2") ground-engaging wheels 34 are mounted on the forks 32. The ground-engaging wheels 34 are not powered, but they are retractable into recesses 36 in the forks 32 via the controls 16. Thus, the wheels 34 can be jacked down through a void in a pallet bottom, permitting the load to be moved when the retractable straddle legs (described hereinafter) are up.

A pair of straddle legs 38 are pivoted on the body 10 at 40. A ground-engaging wheel 42, which need not be either powered or steerable, is mounted on each straddle leg 38. A hydraulic cylinder 44 is connected to an arm 46 at 48 and to the leg 38 at 50.

As best seen in FIG. 7, the straddle legs 38 are mounted for transverse motion relative to the body 10. Hydraulic cylinders 52 are connected to the body 10 at 53 and to the arms 46 at the other end. When the hydraulic cylinders 52 extend, the arms 46 and the legs 38 move outwardly of the body 10 to enable the legs 38 to "straddle" (i.e., move outboard of) loads which are substantially wider than the body 10. Conversely, when the hydraulic cylinders 52 contract, the arms 46 and legs 38 move inwardly of the body 10 to enable the forklift truck to store in a pallet space, move loads into narrow spaces, and manoeuver through narrow doors or between closely spaced obstacles.

Operation of the First Embodiment

The operation of the first embodiment is illustrated in FIGS. 4A to 4F, which show the preferred embodiment first loading a container 54 into the back of a trailer van 56, then loading the forklift truck itself into the back of the trailer van 56.

In FIG. 4A, the container 54 has been picked up on the forks 32, and the forklift truck is approaching the back of the trailer van 56 to load the container 54 into it. The wheels 18 and 42 are in engagement with the ground to keep the weight of the container 54 from over-balancing the forklift truck, but the wheels 28 and 34 are not in use. Drive power and steering are supplied via the wheels 18.

In FIG. 4B, the wheels 34 are resting on the floor 58 of the trailer van 56. The wheels 34 now prevent the weight of the container 54 from over-balancing the forklift truck, and accordingly the hydraulic cylinders 44 can be used to pivot the straddle legs back into their carry position. At this time the operator 14 can also use the hydraulic cylinders 52 to bring the straddle legs 38 inboard if he is about to raise the forklift truck into the back of the trailer van 56, or he can leave the straddle legs 38 in an outboard position if he has more containers to lift into the back of the trailer van.

In FIG. 4C, the powered wheel(s) 18 have been used to bring the forklift truck up next to the back of the trailer van 56, while simultaneously projecting the container 54 into the interior of the trailer van 56.

In FIG. 4D, the hydraulic cylinder 24 has been used to extend the telescopable legs 20, bringing the powered wheels 28 into engagement with the ground, and raising the body 10 until the powered wheel 18 has been brought to the height (or slightly above the height) of the floor 58 of the trailer van 56. Note that, as the body 10 of the forklift truck moves up, the forks 32 simultaneously move down on the lift mast 30, so that the wheels 34 remain in engagement with the floor 58 of the trailer van 56. Note also that, if the telescopable rear legs 20 are angled slightly from the vertical, as shown, the body 10 will move forwardly slightly as it moves upwardly, and accordingly the upward motion must start with the body 10 spaced slightly from the trailer van 56. However, it is desirable to angle the telescopable rear legs 20 as shown so that the wheels 28 will engage the ground well behind the operator 14, ensuring the stability of the truck when it is in the position shown in FIG. 4D.

In FIG. 4E, the powered wheels 28 have been used to drive the body 10 forwardly into the trailer van 56 until the powered wheel 18 has come into engagement with the floor 58 of the trailer van 56, and retraction of the telescopable rear legs 20 has been begun.

In FIG. 4F, the hydraulic cylinders 24 have been used to contract the telescopable legs 20 until the powered wheels 28 have been raised above the height of the floor 58 of the trailer van 56 and the powered wheel 18 has been used to drive the forklift truck forwardly into the interior of the trailer van 56. At this point, the wheels 42 can be pivoted down into engagement with the floor 58 of the trailer van 56, if there is room, or the load 54 can be conveyed to a resting place on a pallet using only the wheels 18 and 34.

As will be apparent, unloading a container 54 from the trailer van 56 is simply the reverse of the procedure described above, and the forklift truck by itself (that is, absent a load 54) can be loaded and unloaded by itself following the same technique. Also, of course, the illustrated forklift truck can be used in any situation where it is desirable to have a forklift truck which is capable of raising and lowering itself back and forth between two surfaces at different levels, and it is by no means limited in its utility to loading and unloading trucks.

The Second Embodiment

FIGS. 8A and 8B schematically illustrate a second embodiment of the invention. In this embodiment, the seat 12 for the operator 14 is mounted on the telescopable rear legs 20, and the controls 16 are split into two parts. Steering controls 15 remain mounted on the body 10, as before, but the lift controls 17 are mounted on the structure carrying the seat 12. This structure permits the operator 14 to remain at ground level while lifting a container 54 to the level of the floor 58 of the trailer van 56. In this embodiment all the hydraulic lines moves up and down with the operator, and only multi-conductor electric cable runs between the upper and lower operator positions.

The Third Embodiment

FIG. 9 illustrates a portion of a third embodiment of the invention. It has been found that some trucks have understructure which is so low and so far back that it interferes with the pivoting movement of the straddle legs 38. Accordingly, in this embodiment each straddle leg 38 is composed of two parts, a first part 60 pivoted on the body 10 to 40 and a second part 62 pivoted on the first part 60 at 64. The hydraulic cylinder 44 is connected to the first part 60 of the straddle leg 38 at 66, and the ground engaging wheel 42 is mounted on the second part 62 of the straddle leg 38 at 68. The first and second parts 60, 62 have surfaces 70 and 72, respectively, which abut when the straddle leg 38 is in its work position (shown in solid line), causing the two parts 60, 62 to act as a single unit. However, when the hydraulic cylinder 44 is retracted, swinging the first part 60 into its carry position (shown in dot-dash line), the second part 62 and the ground-engaging wheel 42 swing down due to the force of gravity, in effect shortening the straddle leg 38 and permitting the ground-engaging wheel 42 to clear the understructure 74 of the truck.

The Fourth Embodiment

Figure 11:
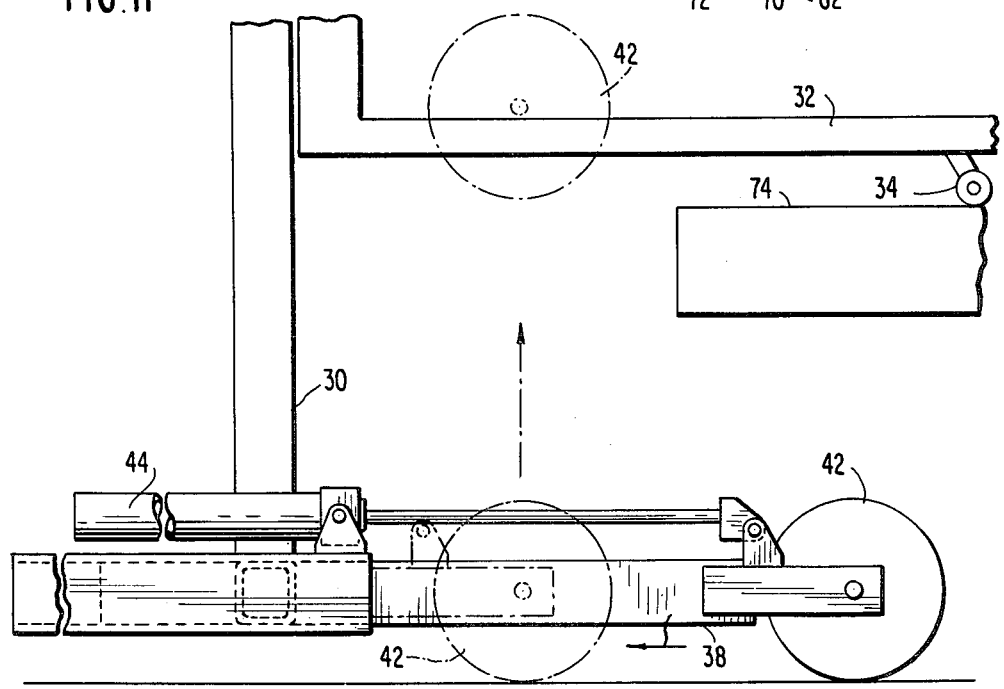
FIG. 11 is a fragmentary view of a fourth embodiment.

FIG. 11 illustrates a portion of a fourth embodiment of the invention. This embodiment is also designed to permit the ground-engaging wheel 42 to clear the understructure 74 of the truck, but it does so in an entirely different fashion. In this embodiment, the straddle legs 38 are telescopically mounted in the body 10, and each hydraulic cylinder 44 moves the associated straddle leg 38 horizontally forwardly and backwardly between its work position (shown in solid line) and its carrying position (shown in dot-dash line).

Caveat

While the present invention has been illustrated by a etailed description of four preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

We claim:

1. A forklift truck capable of raising and lowering itself back and forth between two surfaces at different levels, said forklift truck comprising:
   (a) a body;
   (b) a first ground-engaging wheel mounted on said body;
   (c) first means for driving said first ground-engaging wheel;
   (d) a telescopable rear leg mounted on said body;
   (e) second means for telescoping said rear leg;
   (f) a second ground-engaging wheel mounted on said rear leg;
   (g) third means for driving said second ground-engaging wheel;
   (h) a lift mast mounted on said body;
   (i) a fork mounted on said lift mast;
   (j) fourth means for moving said fork up and down on said lift mast;
   (k) a pair of straddle front legs mounted on said body and movable between a work position in which they support the load and a carry position;
   (l) a third ground-engaging wheel mounted on each of said front legs; and
   (m) fifth means for moving said front legs back and forth between a use position in which said third ground-engaging wheels are in position to support a load and a carry position in which said front legs and said third ground-engaging wheels are out of the way.

2. A forklift truck as recited in claim 1 and further comprising a fourth ground-engaging wheel mounted on said fork.

3. A forklift truck as recited in claim 2 wherein said fourth ground-engaging wheel is retractable.

4. A forklift truck as recited in claim 1 wherein said front legs are also mounted for transverse action relative to said body.

5. A forklift truck as recited in claim 4 and further comprising sixth means for moving said front legs transversely relative to said body.

6. A forklift truck as recited in claim 1 wherein said first ground-engaging wheel is steerable.

7. A forklift truck as recited in claim 1 and further comprising an operator's station mounted on said body.

8. A forklift truck as recited in claim 1 and further comprising an operator's station mounted on said telescopable rear leg.

9. A forklift truck as recited in claim 1 wherein said telescopable rear leg is angled away from the perpendicular so as to provide a larger base when said leg is extended and a more compact overall dimension when said leg is retracted.

10. A forklift truck as recited in claim 1 wherein said straddle front legs are pivotably mounted on said body.

11. A forklift truck as recited in claim 10 wherein:
   (a) said straddle front legs comprise a first part pivotably mounted on said body and a second part pivotably mounted on said first part;
   (b) said third ground-engaging wheels are mounted on said second parts of said straddle front legs; and
   (c) said fifth means are operatively connected to said body and to said first parts of said straddle legs.

12. A forklift truck as recited in claim 1 wherein said straddle front legs are telescopically mounted on said body.

* * * * *